(12) United States Patent
Klein et al.

(10) Patent No.: US 7,086,418 B2
(45) Date of Patent: Aug. 8, 2006

(54) PAINT CONDUIT

(75) Inventors: Udo Klein, Dietzenbach (DE); Joachim Kunkel, Rothenbuch (DE); Winfried Ott, Rodgau (DE); Stephan Templin, Offenbach/Main (DE)

(73) Assignee: LacTec Gesellschaft für moderne Lackiertechnik GmbH, Rodgau (DE)

( * ) Notice: Subject to any disclaimer, the term of this patent is extended or adjusted under 35 U.S.C. 154(b) by 0 days.

(21) Appl. No.: 11/031,319

(22) Filed: Jan. 7, 2005

(65) Prior Publication Data

US 2005/0155661 A1    Jul. 21, 2005

(30) Foreign Application Priority Data

Jan. 16, 2004    (DE) .................... 10 2004 002 324

(51) Int. Cl.
  *F16L 9/18* (2006.01)
(52) U.S. Cl. .................... 138/114; 138/109; 138/148
(58) Field of Classification Search ............... 138/109, 138/114, 148; 285/222.2, 45
  See application file for complete search history.

(56) References Cited

U.S. PATENT DOCUMENTS

| | | | | |
|---|---|---|---|---|
| 3,083,989 A | * | 4/1963 | Press | 285/110 |
| 3,675,951 A | * | 7/1972 | Morin | 285/39 |
| 3,831,635 A | * | 8/1974 | Burton | 138/114 |
| 4,311,403 A | | 1/1982 | Liguori | 401/209 |
| 4,805,942 A | * | 2/1989 | Goodridge | 285/222.1 |

FOREIGN PATENT DOCUMENTS

| | | |
|---|---|---|
| DE | 937 321 | 12/1955 |
| DE | 101 01 056 | 6/2002 |
| WO | 03 086671 | 10/2003 |

* cited by examiner

*Primary Examiner*—Patrick Brinson
(74) *Attorney, Agent, or Firm*—Friedrich Kueffner

(57) ABSTRACT

A paint conduit has a jacket surrounding an interior and a hose arranged in the interior of the jacket. At least one end member is attached to a first end of the jacket and secures a first end of the hose in the jacket. The at least one end member has an end member section inserted between the jacket and the hose. The first end of the hose is at least as long as the jacket within the at least one end member. The hose extends through the at least one end member and an insert is inserted into the first end of the hose and presses the hose radially against the at least one end member.

15 Claims, 3 Drawing Sheets

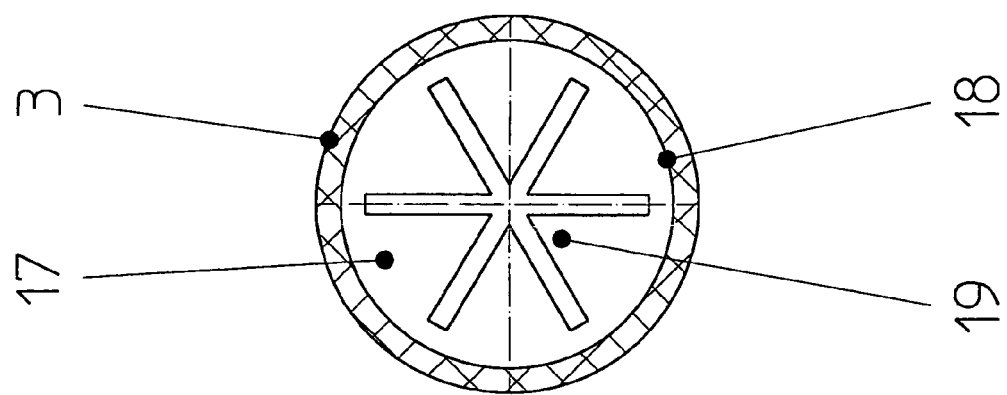
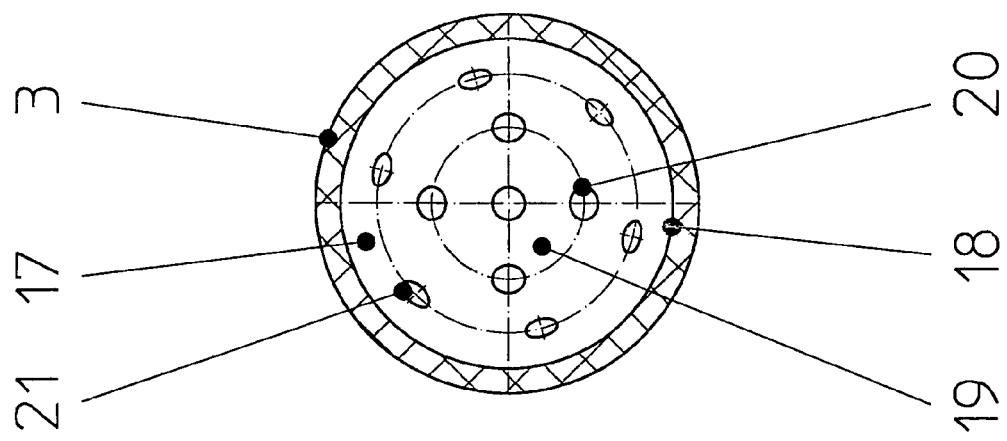

PAINT CONDUIT

BACKGROUND OF THE INVENTION

1. Field of the Invention

The invention relates to a paint conduit comprising a jacket surrounding an interior in which a hose is arranged and comprising at least one end member fastened to one end of the jacket and securing the hose.

2. Description of the Related Art

Such a paint conduit is disclosed in DE 101 01 056 A1.

By means of such a paint conduit, a liquid paint, for example, a liquid enamel paint, is transported from a source to a paint dispensing device, for example, a paint atomizer. When the source is configured as a color changer, it must be taken care that the paint is cleaned from the conduit before another paint can be guided therethrough. In order to recover the liquid paint that is contained in the conduit between the color changer and the dispensing device, it is customary to employ pigs, i.e., bodies that fill the cross-section of the paint conduit and are moved from the dispensing device back to the source. When doing so, the pig moves the liquid paint in front of it and forces it back into the paint source.

DE 101 01 056 A1 proposes to feed a pressure medium into the space between the jacket and the hose which pressure medium compresses the hose and empties it by squeezing it. The liquid paint contained in the hose is thus returned to the source.

This method that can be referred to also as "squeeze" technique is theoretically indeed feasible. However, its realization encounters difficulties in practice. It is necessary to fix two coaxially extending conduits, i.e., the jacket, that can be referred to also as outer conduit, and the hose, that can be referred to also as the inner conduit. The intermediate space between the jacket and the hose must be sealed to the exterior so that pressure loading is possible. For this purpose, in the configuration according to DE 101 01 056 A1 the hose is pushed onto a pipe section. It is secured thereat by residual stress. The pipe section is provided on a section that is adjacent to the end of the jacket with an outer thread onto which a connecting socket is screwed. The jacket is then pushed onto the connecting socket and is secured by a hose clamp.

Mounting of such an end member is extremely complicated. For example, the end of the hose must be manipulated within the interior of the jacket because the hose is significantly shorter than the jacket.

SUMMARY OF THE INVENTION

It is an object of the present invention to simplify mounting of the end member.

In accordance with the present invention, this is achieved in that the end member is inserted with an end member section into the space between the jacket and the hose.

In this configuration, it is no longer necessary to manipulate the hose in the interior of the jacket. Instead, the hose is inserted into the end member and the end member is inserted into the jacket. Accordingly, the hose and the jacket can be handled practically separately from one another. All parts that must be provided with fastening means are freely accessible. Of course, the corresponding end members can be provided on both ends of the paint conduit.

In this connection, it is preferred that the hose at the end is at least as long as the jacket. In this way, it is ensured that accessing the interior of the jacket is not necessary in order to manipulate the hose.

Preferably, the hose extends through the end member wherein an insert is inserted into the end of the hose that forces the hose from the interior against the end member. The hose, that can also be referred to as the "inner conduit", is in this case longer than the jacket that is referred to as the "outer conduit". It is secured by the insert within the end member in such a way that it cannot be retracted by external influences into the interior of the jacket. Because the hose is clamped between the end member and the insert, the hose is also stabilized relative to inner pressures, i.e., loading of the hose can be greater than was possible prior to this, without there being the risk that the hose becomes detached from the end member.

Preferably, the insert has a predominantly closed end face in which one or several through openings are arranged. In this way, the insert takes on an additional function. It not only secures the hose in the end member but it also supports the hose when the intermediate space between the jacket and the hose is pressurized. In this case, the host collapses so that its interior is reduced and the liquid paint contained therein is forced back to the source or can be simply pushed out of the hose. This is not critical over most of the length of the hose. At the end, in the present case within the end member, there is however the risk that the hose is then pushed out through the opening in the end member; this can lead to excessive stressing of the hose. When the end member is, so to speak, closed and only openings are provided that are relatively small so that the hose even in the compressed state cannot pass through, i.e., cannot be jammed in the openings of the end member, the load of the hose is reduced in the area of the attachment.

In this connection, it is preferred that the insert passes without a sharp bend from a clamping area into a support area. The hose is then able to engage, under pressure load from the exterior, about the insert, also free of a sharp bend. This keeps stress within the hose at a minimum. The transition without a sharp bend can be formed in that the insert is shaped like a cone wherein a part of the cone interacts with the end member and an exposed part of the cone projects into the interior of the hose. However, it is also possible to make the end face of the insert round.

In this connection, it is preferred that the end face of the insert is rounded at a radius that is greater than twice the thickness of the wall of the hose. In this way, it is prevented that the hose must be deformed about relatively tight curves. The curvature is instead selected to be so great that excessive stress within the material of the hose can be prevented.

Preferably, through openings are arranged in the boundary area to the clamping area. This has the great advantage that the liquid paint contained in the hose can be displaced almost completely. There are no dead spaces in which the paint residues can collect. In this way, the liquid paint residue that must be removed by means of a rinsing liquid after squeezing is kept small.

Preferably, the end member has at its end a conically widened portion that forms a clamping surface of the clamping area, and the insert has a matching conically shaped counter surface. The hose is then clamped in the clamping area between two conically extending surfaces that extend parallel to one another. In this way, it can be compressed to some extent. Excessive stress is however prevented.

Preferably, the end of the insert facing away from the jacket has a reduction of its outer diameter. The insert has in the clamping area an outer diameter that is somewhat greater than the inner diameter of the hose. In this area, the hose is radially expanded. It can retract again in the area of the reduced outer diameter. This is a measure in order to secure the hose relatively reliably on the insert. The securing forces which must be applied in the clamping area can be kept correspondingly small.

In this connection, it is preferred that the insert is provided with a movement stop. The insert therefore can only be inserted to a certain depth into the end member. Accordingly, it can compress the hose, i.e., load it with forces, in the camping area only to a limited extent. This is a relatively simple but reliable measure in order to maintain the forces acting on the hose within a range that enables securing of the hose on the end member but prevents excessive loading of the hose.

Preferably, the end member has between the insert and the end member section a plurality of openings that are distributed in the circumferential direction and communicate with one another through an annular chamber and are connected to a pressure medium connector. By means of the pressure medium connector, the annular chamber, and the openings, a pressure medium can be supplied into the intermediate space between the jacket and the hose. This, in the end, leads to compression of the hose within the jacket and displacement of the liquid paint from the interior of the hose. When it is ensured that the introduction of the pressure medium is realized relatively close to the end of the hose, it is ensured that the liquid paint can be displaced from the interior of the hose always in the "right" direction. The end member therefore has additionally the task to take over the pressure medium supply. This has two advantages. On the one hand, no additional components are required. On the other hand, the jacket must not be damaged or changed. By generating an opening in the jacket, there is generally the risk that the hose is also damaged or at least impaired with regard to its strength when no additional measures are taken. This risk is eliminated with the presented embodiment.

Preferably, the end member has an inner diameter that matches the outer diameter of the hose and the end member section has a maximum outer diameter that is greater than the inner diameter of the jacket. When the end member section is inserted between the jacket and the hose, the hose remains practically unchanged. The jacket however is widened somewhat radially outwardly so that it is secured on the end member section.

In this connection, it is advantageous when the end member section has at least in a section view a sawtooth shaped rib in the circumferential direction. The rib must not be continuous in the circumferential direction. They form therefore a type of "barb" that prevents that the jacket can be removed easily from the end member section of the end member.

Preferably, the end member section has an outer diameter that tapers in a direction toward an insertion end of the end member. This makes it easier to insert the end member section between the jacket and the hose. In cross-section, the end member section has the shape of a wedge so that the transition between the inner diameter of the end member section and the inner diameter of the jacket is practically located on a straight line. Widening of the jacket in the radial direction is then realized gradually so that excessive stressing of the jacket can be prevented also.

Preferably, the end member comprises an inner part on which the end member section is arranged, a clamping bushing, and an outer part that is detachably connected to the clamping bushing, wherein the outer part loads the inner part relative to the clamping bushing with an axial force. For mounting, first the clamping bushing is placed onto the jacket, the inner part is then inserted into the gap between the jacket and the hose, and, finally, the outer part is mounted. As a result of the assembly, the jacket is secured between the inner part and the clamping bushing so that it cannot be removed even by pulling forces. This means that a pressure medium that has been supplied into the interior between the jacket and the hose does not cause release of the jacket from the end member.

In this connection, it is preferred that the outer part also acts on the insert and forces the insert in the axial direction against the inner part. The outer part thus takes on two functions. In this way, mounting is further simplified. By connecting the outer part to the clamping bushing, the hose, on the one hand, and the jacket, on the other hand, are secured on the inner part.

Preferably, the annular chamber is formed between the outer part and the inner part. This can be simply realized, for example, in that on the inner part an annular groove is provided that is covered by the outer part. On the outer part, a connector for the pressure medium can then be provided.

BRIEF DESCRIPTION OF THE DRAWING

The invention is described in the following with the aid of embodiments in connection with the drawing.

In the drawing:

FIG. 3 is a plan view onto an insert; and

FIG. 4 is a plan view onto a modified embodiment of the insert.

DESCRIPTION OF THE PREFERRED EMBODIMENTS

Figure 1:
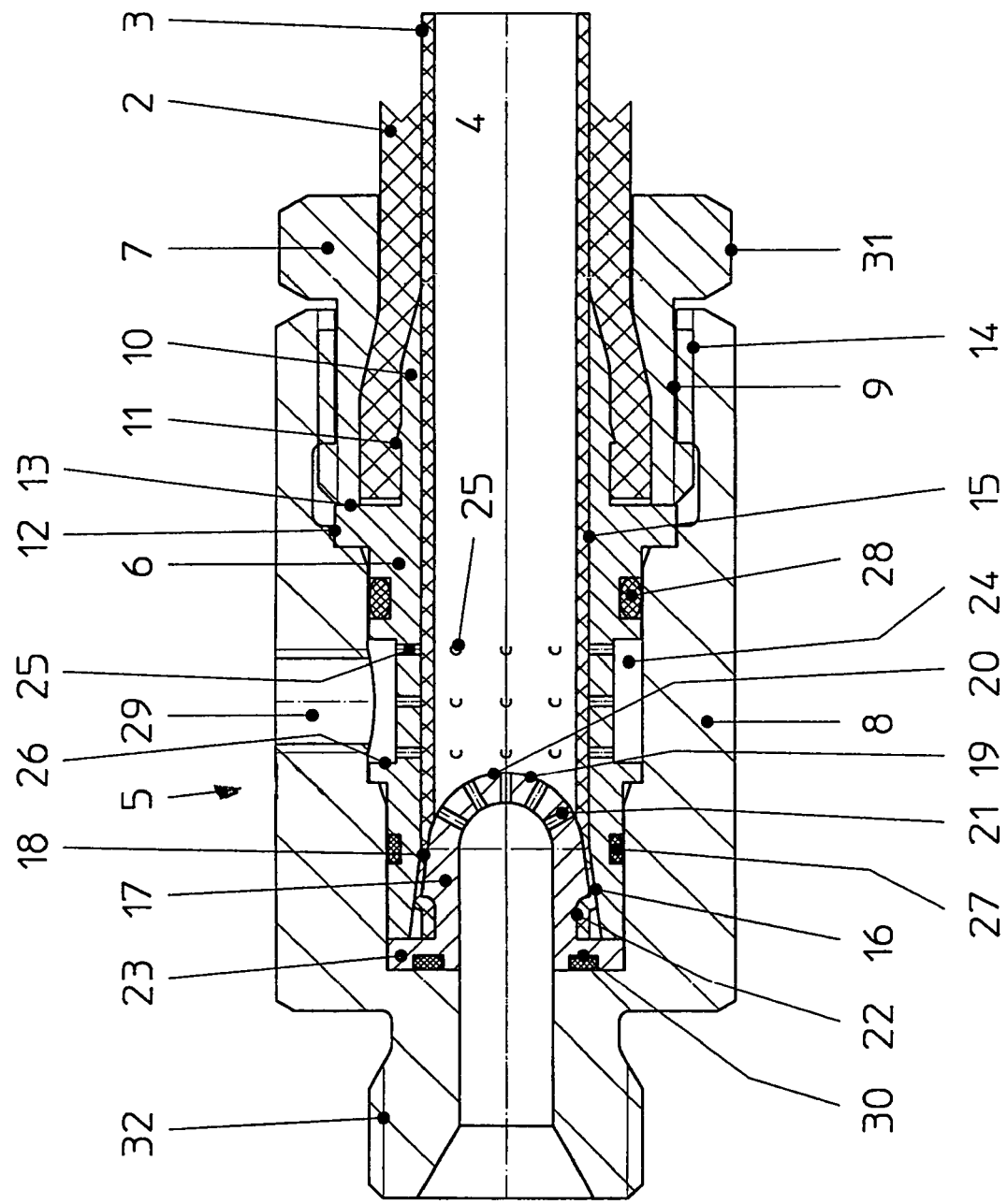
FIG. 1 is a schematic view of a paint conduit with an end member.

A paint conduit 1 has a jacket 2 and a hose 3. The jacket 2 can be referred to also as an "outer conduit". The hose 3 can also be referred to as an "inner conduit". The jacket 2 and the hose 3 are coaxially arranged relative to one another. The hose 3 can rest under residual stress or the effect of the liquid paint, for example, an enamel paint, transported within the interior 4 of the hose against the inner side of the jacket 2, as illustrated.

The hose 3 is longer than the jacket 2, i.e., the hose 3 projects at the end of the jacket 2 (in the drawing to the left) from the jacket 2.

At the end of the jacket 2 an end member 5 is arranged that secures the jacket 2 as well as the hose 3.

The end member 5 has an inner part 6, a clamping bushing 7, and an outer part 8. The outer part 8 is connected to the clamping bushing 7 by a thread pair 9. Instead of a thread pair 9, it is possible to employ other attachment possibility, for example, a bayonet closure.

The inner part 6 has an end member section 10 which has the shape of a wedge in cross-section. This end member section 10 is inserted between the jacket 2 and the hose 3. It widens the jacket 2 radially outwardly. At the circumference of the end member section 10, a rib 11 is arranged which in cross-section has the shape of a sawtooth. As illustrated in the drawing, the rib 11 presses into the inner wall of the jacket 2 and contributes in this way to securing of the jacket 2 on the end member section 10 of the inner part 6. The rib 11 can be comprised of several segments distributed in the circumferential direction. It is also possible to provide more than one of the illustrated rib.

The inner part 6 has a portion 12 of increased diameter that forms a stop surface 13. The stop surface 13 delimits the distance across which the end member section 10 can be inserted into the jacket 2. At the same time, the stop surface 13 forms a boundary in regard to how far the clamping bushing 7 can be inserted, placed or pushed into the outer part 8.

The clamping bushing 7 has a conically tapering inner diameter 14. The outer part 8 acts through the portion 12 of increased diameter on the inner part 6. When the outer part 8 is connected to the clamping bushing 7, the conically tapering inner diameter 14 interacts with the wedge-shaped end member section 10 of the inner part 6 for clamping the jacket 2. In this way, the jacket 2 is secured between the inner part 6 and the clamping bushing 7.

The hose 3 projects through the inner part 6 practically over its entire length. The inner part 6 has for this purpose a continuous bore 15 whose inner diameter matches the outer diameter of the hose 3. The hose 3 ends flush with the inner part 6 at the end that is facing away from the jacket 2.

The bore 15 has an end 16 that widens conically. Into this end 16, an insert 17 is inserted that has a fastening section 18 with a matching conical shape. The insert 17 has an end face 19 that is largely closed, i.e., almost completely closed. This end face 19 is penetrated only by a plurality of relatively small bores 20 wherein a few bores 21 are closely adjacent to the fastening section 18. Instead of the individual bores 20 having an almost circular cross-section as illustrated in FIG. 3, it is also possible, as illustrated in FIG. 4, to provide an opening comprised of crossing slots. Combinations of both embodiments are also conceivable. The inner width of the openings is selected such that the hose 3 cannot enter the openings. The end face 19 has a transition without a sharp bend into the fastening section 18. The end face 19 is rounded and has a radius that is twice as large as the wall thickness of the hose 3.

At its end facing the end 16, the insert 17 has a section 22 of reduced diameter where the hose 3 is constricted. The hose 3 is made of an elastomer material that can widen to some extent when the insert 17 is inserted into the opening at the end of the hose. It will then contract in the area of the reduced diameter section 22 so that the hose 3 in this area is secured already by a certain residual stress on the insert 17.

The insert 17 has at its end a circumferential flange 23 that in the mounted state rests against the end face of the inner part 6. In this connection, the insert 17 is forced by the outer part 8 with its flange 23, on the one hand, against the inner part 6. The flange 23 forms a movement limitation. At the same time, in the fastening section 18 the insert 17 clamps the hose 3 between it and the inner part 6. By means of the movement limitation of the flange 23, it is prevented that the hose 3 is squeezed too much at this location.

Between the outer part 8 and the inner part 6 an angular chamber 24 is formed that communicates by means of a series of openings 25 with the intermediate space between the jacket 2 and the hose 3. In order to illustrate that the openings 25 are uniformly distributed in the circumferential direction, there are also openings 25 shown in dashed lines in the area of the hose 3. Of course, these openings 25 do not penetrate the hose 3.

The annular chamber is formed in that on the outer wall of the inner part 6 a circumferential groove 26 is provided which is covered by the outer part 8. Seals 27, 28 ensure that a pressure medium, for example, compressed air, that is supplied through a pressure medium connector 29, can reach only the intermediate space between the jacket 2 and the hose 3 but cannot escape to the exterior. A further seal 30 is arranged between the end face of the insert 17 on the flange 23 and a corresponding inner end face of the outer part 8.

The clamping bushing 7 has a torque application surface 31. The outer part 8 has an outer thread 32 so that the end member 5 can be connected to a color changer or another paint source or a paint dispensing device. However, it is also possible that the outer part 8 is integrated into a color changer, another paint source, or a paint atomizer or any other paint dispensing or processing device.

For mounting, the jacket 2 is shortened somewhat relative to the hose 3. The clamping bushing 7 is pushed onto the jacket 2. Then the hose 3 is inserted into the bore 15 of the inner part 6. The inner part 6 is pushed with its end member section 10 between the jacket and the hose 3, maximally to such an extent that the jacket 2 hits the stop surface 13.

Subsequently, the insert 17 is inserted into the end of the hose 3. In this connection, the hose 3 is stabilized by the inner part 6 so that the insertion of the insert 17 is possible without problems. Finally, the outer part 8 is placed thereon and connected to the clamping bushing 7, for example, by screwing. With this connection, clamping of the hose in the fastening section 18 as well as the attachment of the jacket 2 between the end member section 10 and the clamping bushing 7 is achieved, wherein in this connection the forces can be dimensioned relatively precisely by the movement stops 13, 23.

Figure 2:
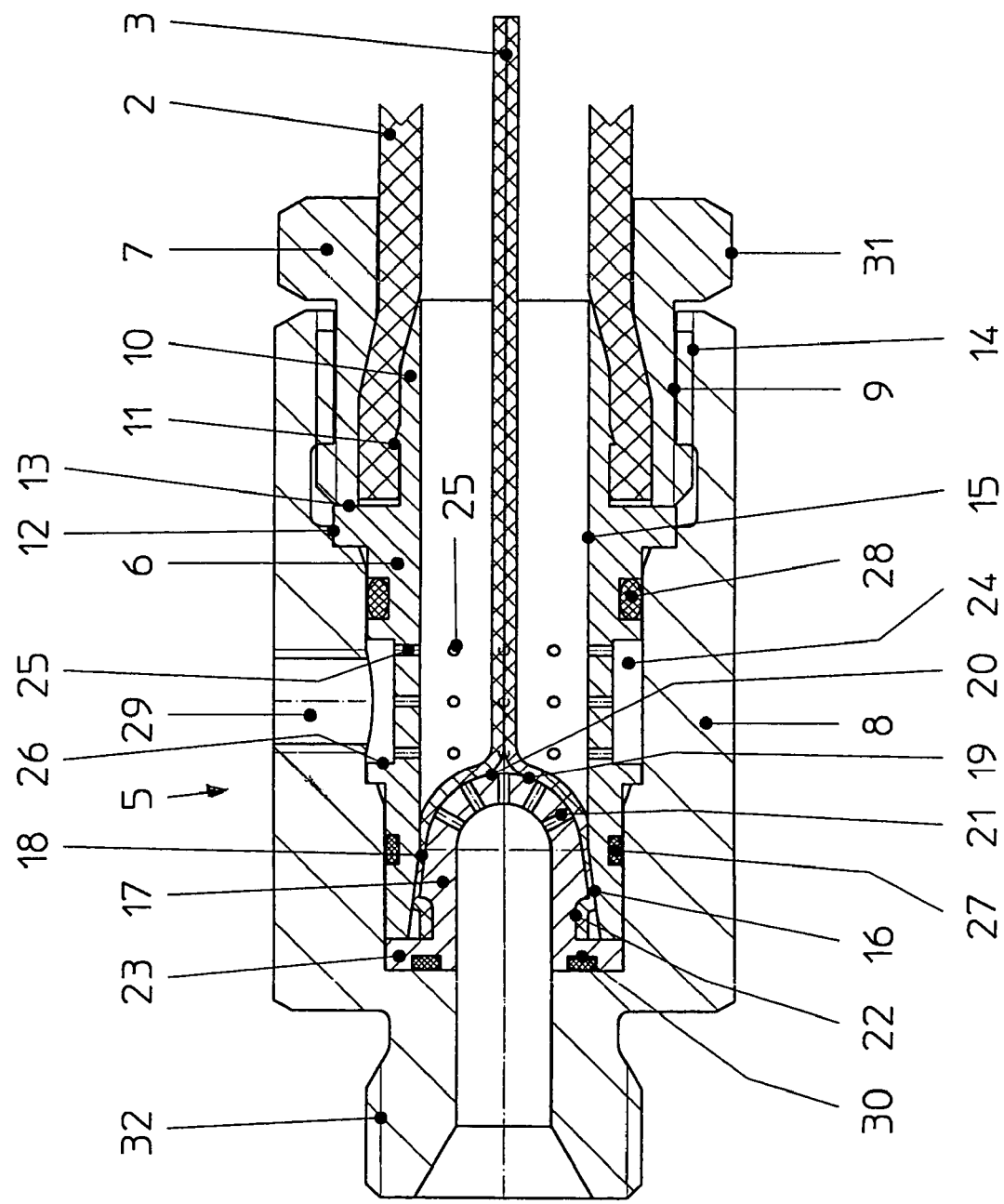
FIG. 2 shows a paint conduit with compressed hose.

In operation, the liquid paint is guided through the interior 4 of the hose 3 from the right to the left, with regard to the illustration in the Figures. When a color change is required, the supply of the liquid paint is interrupted and a pressure medium is supplied through the connector 29. The pressure medium reaches through the openings 25 the intermediate space between the jacket 2 and the hose 3 and compresses the hose 3, as illustrated in FIG. 2. In this connection, the jacket 2 comes to rest against the round end face 19 so that it is not excessively stressed by sharp bends or edges. Because the pressure loading is realized relatively near the end of the hose 3, the hose 3 is compressed starting at this end and displaces the liquid paint out of the interior 4 to the right. For supplying the pressure medium, it is not necessary to damage the jacket 2.

While specific embodiments of the invention have been shown and described in detail to illustrate the inventive principles, it will be understood that the invention may be embodied otherwise without departing from such principles.

What is claimed is:

1. A paint conduit comprising:
    a jacket surrounding an interior;
    a hose arranged in the interior of the jacket;
    at least one end member attached to a first end of the jacket and securing a first end of the hose in the jacket;
    wherein the at least one end member has an end member section inserted between the jacket and the hose, further comprising an insert, wherein the hose extends through the at least one end member and the insert is inserted into the first end of the hose and presses the first end of the hose radially against the at least one end member, wherein the insert has a predominantly closed end face provided with at least one through opening, and wherein an intermediate space between the jacket and the hose is in communication with a pressure medium connector.

2. The paint conduit according to claim 1, wherein the first end of the hose is at least as long as the jacket within the at least one end member.

3. The paint conduit according to claim 1, wherein the insert has a fastening section and a support area, wherein an area between the fastening section and the support area is without a sharp bend.

4. The paint conduit according to claim 1, wherein the end face of the insert is rounded with a radius that is greater than twice a thickness of a wall of the hose.

5. The paint conduit according to claim 3, wherein the at least one through opening is arranged at a boundary to the fastening section.

6. The paint conduit according to claim 3, wherein the at least one end member has an end with a conically widened potion having a conical clamping surface and the fastening section of the insert has a matching conically shaped counter surface.

7. A paint conduit comprising:
a jacket surrounding an interior;
a hose arranged in the interior of the jacket;
at least one end member attached to a first end of the jacket and securing a first end of the hose in the jacket;
wherein the at least one end member has an end member section inserted between the jacket and the hose, further comprising an insert, wherein the hose extends through the at least one end member and the insert is inserted into the first end of the hose and presses the first end of the hose radially against the at least one end member, wherein the insert has an end facing away from the jacket and the end of the insert has a reduced outer diameter portion.

8. The paint conduit according to claim 1, wherein the insert has a movement stop.

9. A paint conduit comprising:
a jacket surrounding an interior;
a hose arranged in the interior of the jacket;
at least one end member attached to a first end of the jacket and securing a first end of the hose in the jacket;
wherein the at least one end member has an end member section inserted between the jacket and the hose, further comprising an insert, wherein the hose extends through the at least one end member and the insert is inserted into the first end of the hose and presses the first end of the hose radially against the at least one end member, wherein the at least one end member has a plurality of openings distributed in a circumferential direction of the at least one end member, wherein the openings are arranged in an area between the insert and the end member section, wherein the openings communicate through an annular chamber with one another and are connected to a pressure medium connector.

10. The paint conduit according to claim 9, wherein the at least one end member comprises an inner part provided with the end member section, a clamping bushing, and an outer part that is detachably connected to the clamping bushing, wherein the annular chamber is formed between the outer part and the inner part of the at least one end member.

11. The paint conduit according to claim 1, wherein the at least one end member has an inner diameter that matches an outer diameter of the hose and wherein the end member section has a maximum outer diameter that is greater than an inner diameter of the jacket.

12. The paint conduit according to claim 1, wherein the at least one end member comprises an inner part provided with the end member section, a clamping bushing, and an outer part that is detachably connected to the clamping bushing, wherein the outer part loads the inner part relative to the clamping bushing with an axial force.

13. A paint conduit comprising:
a jacket surrounding an interior;
a hose arranged in the interior of the jacket;
at least one end member attached to a first end of the jacket and securing a first end of the hose in the jacket;
wherein the at least one end member has an end member section inserted between the jacket and the hose, further comprising an insert, wherein the hose extends through the at least one end member and the insert is inserted into the first end of the hose and presses the first end of the hose radially against the at least one end member, wherein the insert has a predominantly closed end face provided with at least one through opening, and wherein an intermediate space between the jacket and the hose is in communication with a pressure medium connector, wherein the at least one end member comprises an inner part provided with the end member section, a clamping bushing, and an outer part that is detachably connected to the clamping bushing, wherein the outer part acts on the insert and forces the insert in an axial direction against the inner part.

14. The paint conduit according to claim 1, wherein the end member section has at least one rib extending in a circumferential direction of the at least one end member, wherein the at least one rib is sawtooth shaped in a section view.

15. The paint conduit according to claim 1, wherein the end member section has an outer diameter tapering in a direction toward an insertion end of the end member section.

* * * * *